(12) United States Patent
Mate et al.

(10) Patent No.: US 8,168,311 B2
(45) Date of Patent: May 1, 2012

(54) MAGNETIC RECORDING DISK HAVING PRE-PATTERNED SURFACE FEATURES AND PLANARIZED SURFACE

(75) Inventors: Charles Mathew Mate, San Jose, CA (US); Franck Dreyfus Rose, San Jose, CA (US); Kurt Allan Rubin, San Jose, CA (US); Steven Gary Schmid, San Jose, CA (US); Tushar Keshubhai Suther, Milpitas, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 75 days.

(21) Appl. No.: 12/753,683

(22) Filed: Apr. 2, 2010

(65) Prior Publication Data

US 2011/0244273 A1 Oct. 6, 2011

(51) Int. Cl.
*G11B 5/66* (2006.01)
(52) U.S. Cl. ....................................................... 428/833
(58) Field of Classification Search ........................ None
See application file for complete search history.

(56) References Cited

U.S. PATENT DOCUMENTS

| | | | |
|---|---|---|---|
| 5,552,204 A | 9/1996 | Ahlert et al. | |
| 6,565,718 B1 | 5/2003 | Chour et al. | |
| 6,680,079 B1 | 1/2004 | Stirniman et al. | |
| 7,225,528 B2 | 6/2007 | Suwa et al. | |
| 7,494,727 B2* | 2/2009 | Suwa et al. | 428/832.2 |
| 2005/0045581 A1 | 3/2005 | Suwa et al. | |
| 2005/0199581 A1* | 9/2005 | Suwa et al. | 216/22 |
| 2005/0243467 A1 | 11/2005 | Takai et al. | |
| 2006/0063042 A1* | 3/2006 | Takai et al. | 428/848.2 |
| 2006/0172154 A1 | 8/2006 | Suwa et al. | |
| 2007/0275270 A1 | 11/2007 | Hattori et al. | |
| 2009/0067093 A1* | 3/2009 | Haginoya et al. | 360/234.3 |
| 2009/0086372 A1 | 4/2009 | Ichihara et al. | |
| 2010/0002329 A1 | 1/2010 | Hsia et al. | |

FOREIGN PATENT DOCUMENTS

JP  2006120222 A  5/2006
JP  2009193650 A  8/2009

* cited by examiner

*Primary Examiner* — Holly Rickman
(74) *Attorney, Agent, or Firm* — Thomas R. Berthold (57) ABSTRACT

A magnetic recording disk with pre-patterned surface features of elevated lands and recessed grooves or trenches, like a discrete-track media (DTM) or bit-patterned media (BPM) disk, has a planarized surface. A multilayered disk overcoat is used to protect the recording layer, and at least one of the overcoat layers functions as a stop layer for terminating a chemical-mechanical polishing (CMP) process that substantially planarizes the disk. All of the layers of the multilayered overcoat are located above the lands, but none of the overcoat layers, or a number of layers less than the number of layers over the lands, is located above the recesses.

8 Claims, 13 Drawing Sheets

MAGNETIC RECORDING DISK HAVING PRE-PATTERNED SURFACE FEATURES AND PLANARIZED SURFACE

BACKGROUND OF THE INVENTION

1. Field of the Invention

This invention relates generally to a magnetic recording disk with pre-patterned surface features of elevated lands and recessed grooves or trenches, and more particularly to such a disk with a planarized surface.

2. Description of the Related Art

Conventional magnetic recording hard disk drives use either horizontal recording wherein the magnetized regions that define the magnetically recorded data bits are oriented in the plane of the recording layer on the hard disks, or perpendicular recording wherein the magnetized regions are oriented perpendicular to the plane of the recording layer. The conventional disk is a "continuous-media" (CM) disk wherein the recording layer is a continuous layer of magnetic material that becomes formed into concentric data tracks containing the magnetically recorded data bits when the write head writes on the magnetic material. The recording layer also includes a pre-recorded pattern of servo sectors that are used to position the read/write heads to the desired data tracks and maintain the heads on the data tracks during reading and writing. The conventional CM disk has a protective overcoat, typically formed of amorphous carbon, like diamond-like carbon (DLC), that covers the recording layer and provides a generally smooth planar surface. The read/write heads are located on air-bearing sliders that are supported above the smooth disk surface on a thin film of air or "air-bearing" as the disk rotates.

A variation of a CM disk is a "discrete-track media" (DTM) disk, meaning that the concentric data tracks of continuous magnetic material are radially separated from one another by concentric nonmagnetic guard bands. DTM disks are known in the art, as described for example in U.S. Pat. No. 4,912,585. In a DTM disk, the data tracks are typically elevated lands that contain magnetic material and the nonmagnetic guard bands are trenches or grooves that are recessed below the elevated lands. The nonmagnetic guard bands are either formed of nonmagnetic material or contain magnetic material but are recessed far enough below the elevated data tracks to not adversely the readback signals from the data tracks.

In addition to CM disks and DTM disks, magnetic recording disks with "bit-patterned media" (BPM) have been proposed to increase the data density. In BPM disks, the magnetizable material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic domains separated by domain walls. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses.

DTM disks and BPM disks also require servo sectors that are angularly spaced around the disk and extend generally radially across the concentric data tracks. The servo sectors are pre-recorded patterns that cannot be written over by the write heads and that are used to position the read/write heads to the desired data tracks and maintain the heads on the data tracks during reading and writing. In both DTM disks and BPM disks, the servo sectors may be pre-patterned surface features of elevated servo blocks of magnetic material separated by nonmagnetic trenches or recesses.

There are several methods for fabricating disks with surface features of elevated lands and recessed grooves. In one technique, applicable for both DTM and BPM disks, all the required layers, including the layer or layers of magnetic recording material, are deposited on the disk substrate, typically by sputter deposition. The disk is then lithographically patterned into the desired pattern of data tracks and guard bands, as well as servo sectors. A vacuum etch process, such as ion milling or reactive ion etching (RIE), then removes the exposed magnetic recording material. This results in lands of magnetic material and nonmagnetic grooves recessed from the upper surface of the lands.

In another technique, particularly applicable for BPM disks, the disks are produced by replication from a mold via nanoimprinting. The nanoimprinting process forms not only the isolated data islands in the data tracks, but also the servo blocks in the servo sectors. In nanoimprinting, a mold or template replicates a topographic pattern of surface features onto a polymeric resist coating on the disk substrate. The disk substrate may have a dielectric coating, such as a silicon nitride film. The nanoimprinted resist pattern is then used as a mask for etching the pattern into the silicon nitride film with a fluorine plasma. After etching the silicon nitride, the resist is removed. Magnetic material is then sputter deposited over the lands and grooves. The grooves may be recessed far enough from the read/write heads to not adversely affect reading or writing, or they may be "poisoned" with a dopant material to render them nonmagnetic.

For DTM disks and BPM disks there is a need to planarize the surface topography so that the slider is maintained at a relatively constant "fly height" by the air-bearing generated by the rotating disk. Planarization is especially important to reduce or eliminate slider excitations induced by transitioning from a data to servo region or from a servo to data region.

What is needed is a disk with pre-patterned surface features of elevated lands and recessed grooves or trenches that has a planarized surface.

SUMMARY OF THE INVENTION

In the disk according to this invention a multilayered disk overcoat is used, and at least one of the overcoat layers functions as a stop layer for terminating a chemical-mechanical polishing (CMP) process that substantially planarizes the disk. All of the layers of the multilayered overcoat are located above the lands, but none of the overcoat layers, or a number of layers less than the number of layers over the lands, is located above the recesses.

In a first embodiment, a first overcoat layer of a subsequent multilayered overcoat is deposited on top of the recording layer. The first overcoat layer will function as a CMP stop layer. The disk is then lithographically patterned and etched, leaving elevated lands of recording layer material and grooves or recesses. The lands have an upper surface on which the first overcoat layer is deposited and the recesses have a lower surface below the upper surface of the lands. The etching may been performed to a depth such that all of the recording layer material is removed from the regions of the recesses, or to a depth such that only a portion of the recording layer material is removed. Fill material is then deposited over the entire surface of the etched disk, and CMP is then performed. The material selected for the fill material has a CMP removal rate that is faster than the CMP removal rate for the first overcoat layer so that the first overcoat layer functions as a CMP stop layer. After CMP, a second overcoat layer is deposited, typically by sputter deposition, on the substantially planar surface of the upper surface of the first overcoat layer and the upper surface of the fill material. The second overcoat layer can be a different or a similar material to the first overcoat layer. In the first embodiment the first overcoat layer is located only on the lands and the second overcoat layer is located on both the lands and the fill material in the recesses.

In a second embodiment, both overcoat layers are located only above the lands and no overcoat layer is located above the fill material in the recesses, so that the upper surface of the second overcoat layer is substantially planar with the upper surface of the fill material in the recesses.

In a third embodiment the disk is lithographically patterned and etched before the first overcoat layer is deposited, leaving elevated lands of recording layer material and grooves or recesses. The first overcoat layer of a subsequent multilayered overcoat is then deposited over the entire surface of the etched disk to cover the top surface of the lands, the lower surface of the recesses and the sidewalls of the recesses. The first overcoat layer will function as a CMP stop layer. Fill material is then deposited over the entire surface of the disk to cover the first overcoat on the top surface of the lands and fill the recesses. CMP is then performed using the first overcoat layer as a CMP stop layer. After CMP, a second overcoat layer is deposited on the substantially planar surface of the upper surface of first overcoat layer and the upper surface of the fill material. In the third embodiment the first overcoat layer is located on the lands, in the bottom of the recesses and the sidewalls of the recesses, and the second overcoat layer is located on both the lands and the fill material in the recesses.

The fill material may be a silicon oxide (SiOx), a silicon nitride (SiN), a SiOx-metal or SiN-metal, amorphous carbon, a Ti alloy, or a metal selected from W, Ti, Ta, and Cu. The materials that may be used for the first and second overcoat layers include amorphous carbon, carbides such as silicon carbides and boron carbides, nitrides such as silicon nitrides, titanium nitrides, and boron nitrides, and metal oxides, such as $TiO_2$, $ZrO_2$, $Al_2O_3$, $Cr_2O_3$, $Ta_2O_5$ and $ZrO_2$—$Y_2O_3$.

For a fuller understanding of the nature and advantages of the present invention, reference should be made to the following detailed description taken together with the accompanying figures.

DETAILED DESCRIPTION OF THE INVENTION

Figure 1:
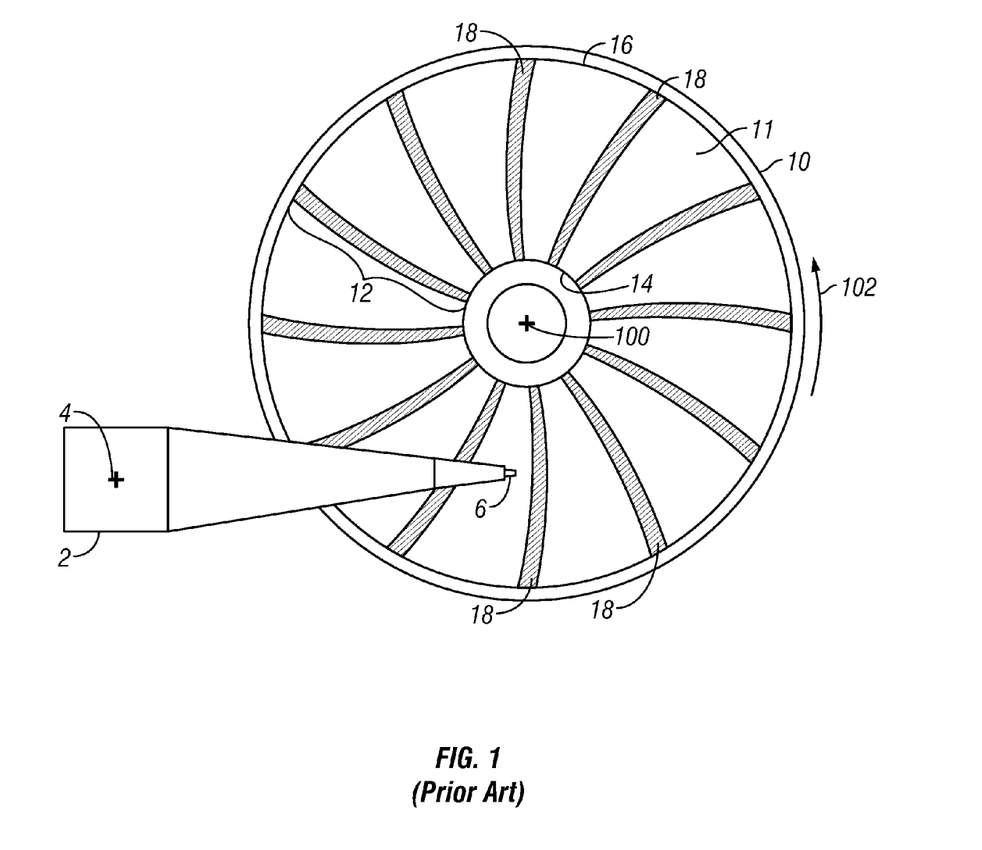
FIG. 1 is a schematic of a disk drive with a rotary actuator and a rigid magnetic recording disk that may be a discrete-track media (DTM) disk or a bit-patterned media (BPM) disk with pre-patterned servo sectors.

FIG. 1 illustrates a disk drive with a rotary actuator 2 and a rigid magnetic recording disk 10 having pre-patterned surface features formed on surface 11. The surface features include at least pre-patterned servo blocks in angularly-spaced servo sectors 18. The disk 10 rotates in the direction 102 about a central axis 100. The surface 11 has an annular data band 12 which is defined by an inside diameter (ID) 14 and an outside diameter (OD) 16. The portions of the data band between the servo sectors 18 are used for the storage of user data and contain circular data tracks, with each data track being typically divided into physical data sectors. The disk 10 may be a DTM disk, in which case the circular data tracks are discrete radially-spaced elevated tracks separated by recessed guard bands, with the elevated tracks and recessed guard bands forming surface features in addition to the servo blocks in servo sectors 18. The disk 10 may also be a BPM disk, in which case the circular data tracks contain discrete elevated data islands separated by recesses, with the elevated islands and recesses forming surface features in addition to the servo blocks in servo sectors 18.

The rotary actuator 2 rotates about pivot 4 and supports a read/write head 6 at its end. As the actuator 2 rotates, the head 6 follows a generally arcuate path between ID 14 and OD 16. The servo sectors 18 form a pattern of angularly spaced arcuate lines that extend generally radially from ID 14 to OD 16. The arcuate shape of the servo sectors matches the arcuate path of head 6. During operation of the disk drive, the head 6 reads or writes data on a selected one of a number of concentric circular data tracks located between the ID 14 and OD 16 of the annular data band 12. To accurately read or write data from a selected track, the head 6 is required to be maintained over the centerline of the track. Accordingly, each time one of the servo sectors 18 passes beneath the head 6, the head 6 detects discrete magnetized servo blocks in the position error signal (PES) field in the servo sector. A PES is generated and used by the disk drive's head positioning control system to move the head 6 towards the track centerline. Thus, during a complete rotation of the disk 10, the head 6 is continually maintained over the track centerline by servo information from the servo blocks in successive angularly spaced servo sectors 18.

Figure 2A:
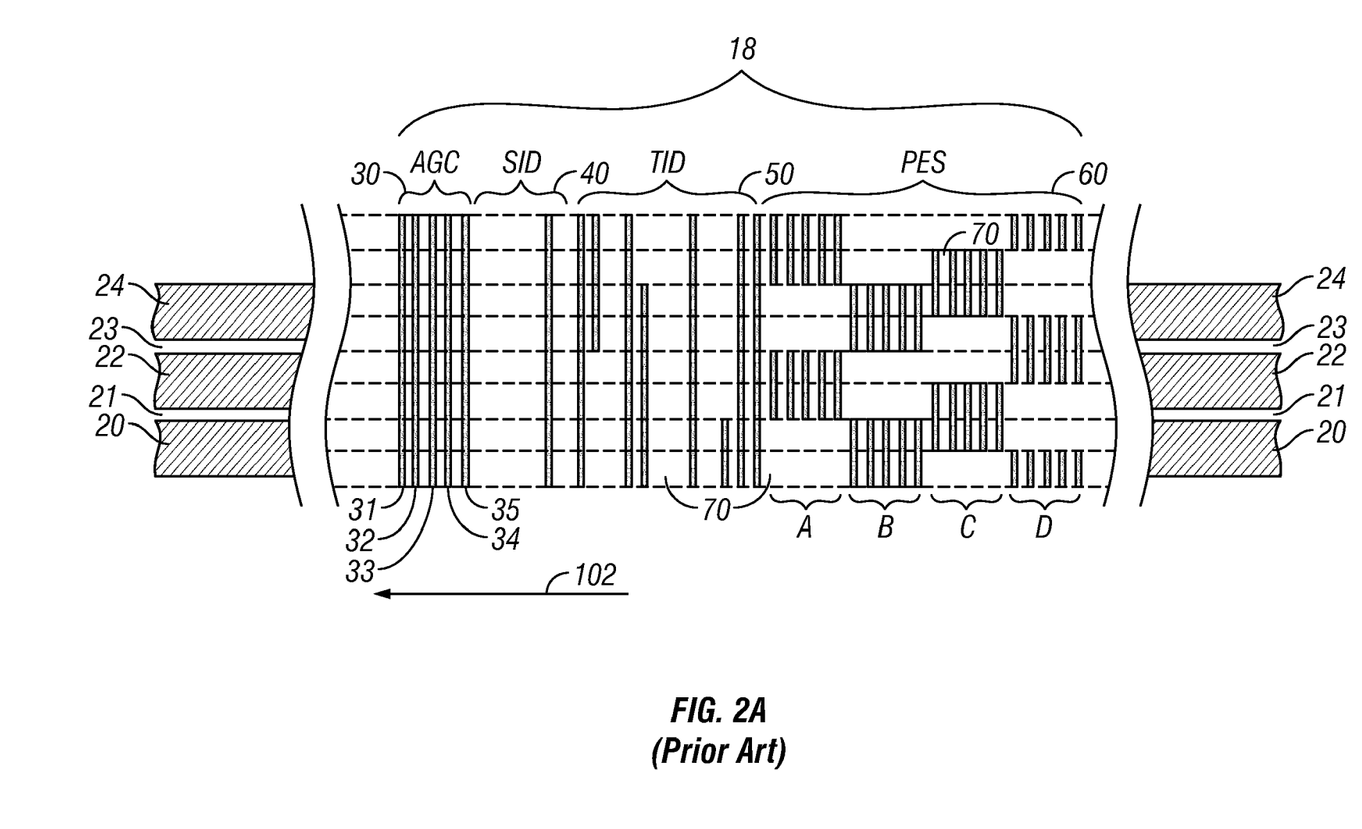
FIG. 2A is a schematic of a top view of a DTM disk and shows a typical servo sector with elevated servo blocks and portions of three elevated data tracks separated by recessed guard bands.

FIG. 2A is an expanded top view of disk 10 where the disk is a DTM disk and shows a typical servo sector 18 and portions of three DTM data tracks 20, 22, 24. Three discrete elevated data tracks 20, 22, 24 and two recessed guard bands 21, 23 are shown. All of the shaded portions of servo sector 18 represent discrete elevated servo blocks magnetized in the same direction. They may all be magnetized in the same direction horizontally, i.e., in the plane parallel to the plane of the paper in FIG. 2A if the disk drive is designed for longitudinal or horizontal magnetic recording, or perpendicularly, i.e., into or out of the plane of the paper if the disk drive is for perpendicular magnetic recording. The non-shaded regions 70 in servo sector 18, and the guard bands 21, 23, represent nonmagnetic regions that are recessed from the elevated servo blocks and elevated data tracks 20, 22, 24. The term "nonmagnetic" means that the regions 70 between the servo blocks, and guard bands 21, 23 between the data tracks 20, 22, 24, are recesses or grooves that contain a nonferromagnetic material, such as a dielectric, or a material that has no substantial remanent moment in the absence of an applied magnetic field, or a ferromagnetic material that is recessed far enough below the elevated servo blocks to not adversely affect reading or writing. The nonmagnetic regions 70 and guard bands 21, 23 may also be recessed grooves or trenches in the magnetic recording layer or disk substrate that contain no ferromagnetic material.

The servo blocks that make up servo sector 18 are arranged in fields 30, 40, 50 and 60, as shown in FIG. 2A. Servo field 30 is an automatic gain control (AGC) field of blocks 31-35 that are used to measure the amplitude of the signal and adjust the gain for the subsequently read servo blocks. Servo field 40 is sector identification (SID) field, also called a servo timing mark or S™ field, to provide a timing mark to establish start/stop timing windows for subsequent servo blocks. Servo field 50 is a track identification (TID), also called the cylinder or CYL field because the tracks from all of the disk surfaces in a disk drive with a multiple stacked disks from a "cylinder" of tracks. The TID field 50 contains the track number, typically Gray-coded, and determines the integer part of the radial position. Servo field 60 is the position error signal (PES) field, which in this example contain A, B, C, D subfields of servo blocks as part of the well-known "quad-burst" PES pattern, and are used to determine the fractional part of the radial position.

Figure 2B:
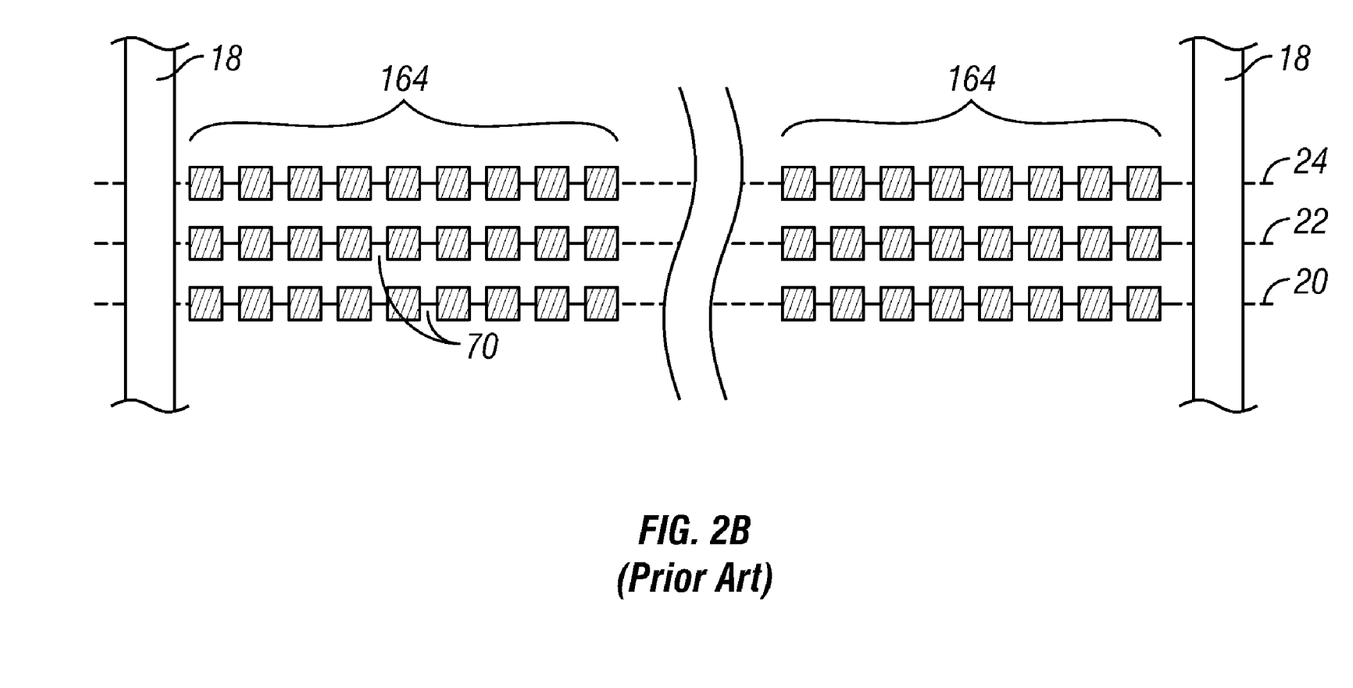
FIG. 2B is a schematic of a top view of a portion of a BPM disk and shows three data tracks each containing discrete isolated data islands separated by recessed nonmagnetic regions.

FIG. 2B is a schematic illustration of a top view of a portion of disk 10 where the disk is a BPM disk. The three data tracks 20, 22, 24 each contain discrete isolated data islands 164 and are shown with two successive servo sectors 18 that extend generally radially across the concentric data tracks 20, 22, 24. The islands 164 are depicted as having a square shape, but the islands may be patterned in different shapes, such as circular, generally elliptical or generally rectangular. Like the servo blocks in servo sector 18 (FIG. 2A), each data track 20, 22, 24 contains discrete elevated spaced-apart lands that are islands 164 of magnetic material. The discrete islands are separated from other islands by recessed nonmagnetic regions 70. The BPM disk shown in FIG. 2B thus contains surface features of elevated lands and recessed grooves not only in the servo sectors 18, but also in the data tracks 20, 22, 24.

The planarized disk with surface features of elevated lands and recessed grooves according to the invention, and the method for planarizing the disk, will be explained with FIGS. 3A-3E, which show sectional views of a DTM disk taken along a plane perpendicular to the discrete data tracks at various stages of the method. However, the method and resulting disk planarized by the method are also fully applicable to a BPM disk. In this invention a multilayered disk overcoat is used, and at least one of the overcoat layers functions as a stop layer for terminating a chemical-mechanical polishing (CMP) process that substantially planarizes the disk. All of the layers of the multilayered overcoat are located above the lands but none of the overcoat layers, or a number of layers less than the number of layers over the lands, are located above the recesses.

Figure 3A:
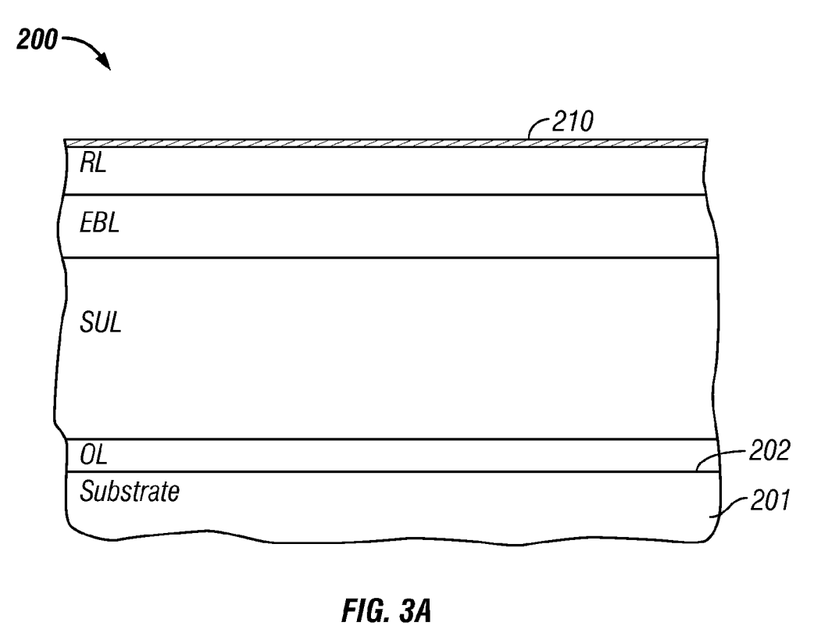
FIGS. 3A-3E are sectional views of a DTM disk taken along a plane perpendicular to the discrete data tracks at various stages of the method for planarizing a disk according to an embodiment of the invention.

FIG. 3A is a sectional view showing the disk 200 prior to lithographic patterning and etching to form the DTM disk. The disk 200 is a substrate 201 having a generally planar surface 202 on which the representative layers are deposited, typically by sputtering. The disk 200 is depicted as a perpendicular magnetic recording disk with a recording layer (RL) having perpendicular (i.e., generally perpendicular to substrate surface 201) magnetic anisotropy and an optional soft magnetic underlayer (SUL) below the RL. The optional SUL serves as a flux return path for the magnetic write field from the disk drive write head.

The hard disk substrate 201 may be any commercially available glass substrate, but may also be a conventional aluminum alloy with a NiP surface coating, or an alternative substrate, such as silicon, canasite or silicon-carbide. An adhesion layer or onset layer (OL) for the growth of the SUL may be an AlTi alloy or a similar material with a thickness of about 2-10 nm is deposited on substrate surface 202.

The SUL may be formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. The SUL may also be a laminated or multilayered SUL formed of multiple soft magnetic films separated by nonmagnetic films, such as electrically conductive films of Al or CoCr. The SUL may also be a laminated or multilayered SUL formed of multiple soft magnetic films separated by interlayer films that mediate an antiferromagnetic coupling, such as Ru, Ir, or Cr or alloys thereof. The SUL may have a thickness in the range of about 5 to 50 nm.

An exchange-break layer (EBL) is typically located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. The EBL may have a thickness in the range of about 5 to 40 nm.

The RL may be a single layer or multiple layers of any of the known amorphous or crystalline materials and structures that exhibit perpendicular magnetic anisotropy. Thus, the RL may be a layer of granular polycrystalline cobalt alloy, such as a CoPt or CoPtCr alloy, with a suitable segregant such as oxides of one or more of Si, Ta, Ti, Nb, Cr, V and B. Also, the RL may be composed of multilayers with perpendicular magnetic anisotropy, such as Co/Pt, Co/Pd, Fe/Pt and Fe/Pd multilayers, with or without a suitable segregant such as those mentioned above. In addition, perpendicular magnetic layers containing rare earth elements are useable for the RL, such as CoSm, TbFe, TbFeCo, GdFe alloys. The RL may also be formed of chemically ordered CoPt, CoPd, FePt or FePd. These chemically ordered alloys, in their bulk form, are known as face-centered tetragonal (FCT) $L1_0$-ordered phase materials (also called CuAu materials). The c-axis of the $L1_0$ phase is the easy axis of magnetization and is oriented perpendicular to the substrate. Like the Co/Pt and Co/Pd multilayers, these layers exhibit very strong perpendicular magnetic anisotropy. The total thickness of the RL is typically in the range of about 5 to 25 nm.

A first overcoat layer 210 of a subsequent multilayered overcoat is deposited on top of the RL. The first overcoat layer 210 will function as a CMP stop layer and is preferably a layer of amorphous carbon like diamond-like carbon (DLC), or a silicon nitride (SiN) such as predominantly $Si_3N_4$, sputter deposited to a thickness of about 1 to 3 nm. The amorphous carbon CMP stop layer may contain elements such as hydrogen or nitrogen.

Figure 3B:
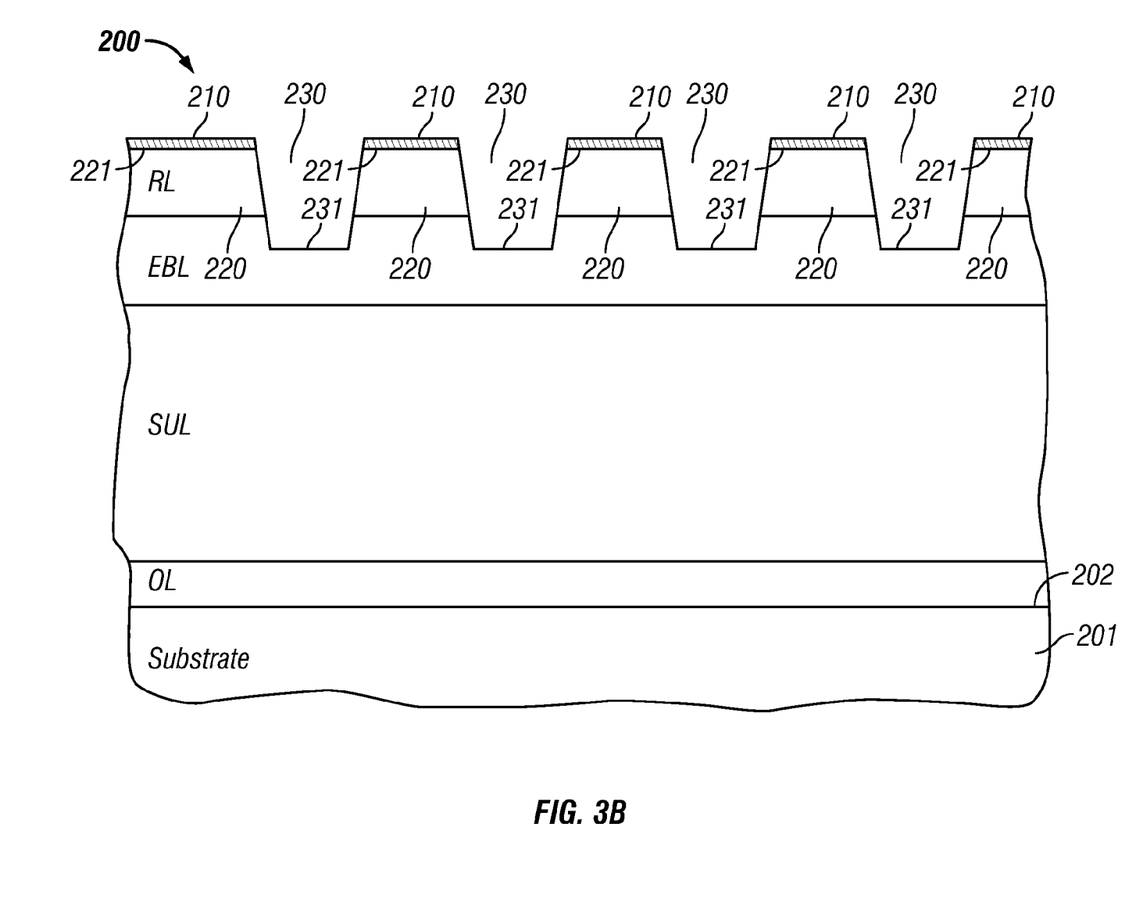

FIG. 3B is a sectional view of the disk 200 after lithographic patterning and etching. The etching may be a vacuum etching process like ion milling or reactive ion etching (RIE). After etching, elevated lands 220 of RL material and grooves or recesses 230 are formed above the substrate surface 202.

The lands 220 have an upper surface 221 on which the first overcoat layer 210 is deposited. The recesses 230 have a lower surface 231 below the upper surface 221 of the lands 220. In the example shown in FIG. 3B, the etching has been performed to a depth such that all of the RL material and a portion of the EBL material has been removed from the regions of the recesses 230. However, alternatively the etching can be performed to a depth such that only a portion of the RL material is removed. In that case, there would be a layer of RL material below the lower surface 231 of the recesses 230.

Figure 3C:
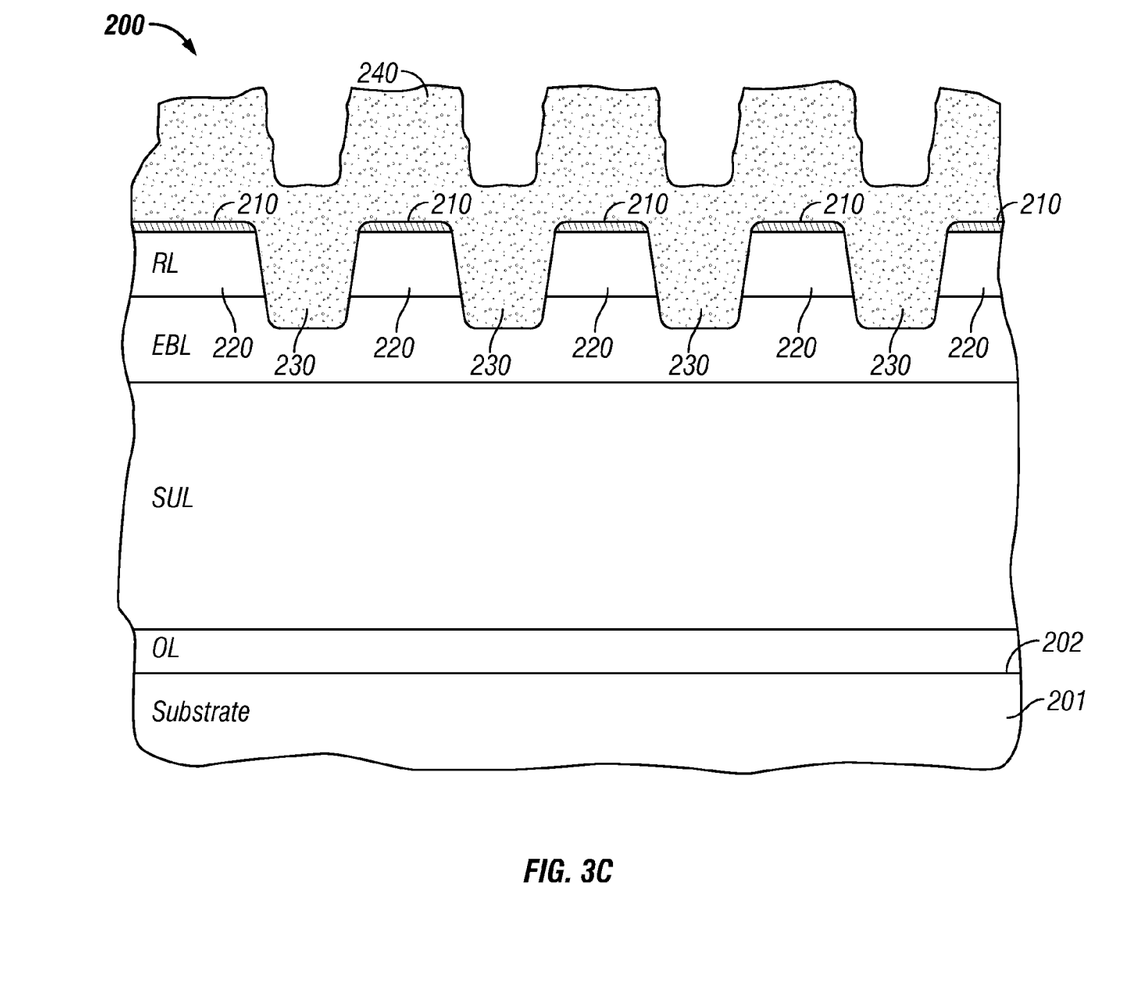

FIG. 3C is a sectional view of the disk 200 after deposition of fill material 240. The fill material 240 is preferably a silicon oxide (SiOx), such as predominantly $SiO_2$, that is sputter deposited. Other materials that may be used for the fill material 240 include a silicon nitride (SiN) such as predominantly $Si_3N_4$; SiOx-metal or SiN-metal where the metal can be Ti, Ta, Al Cr or Pt; amorphous DLC including hydrogenated or nitrogenated amorphous DLC; Ti alloys; and a metal selected from W, Ti, Ta, and Cu. The fill material may be sputter deposited as a single continuous layer or in multiple layers, as would be the case if the sputter deposition is done in multiple steps, such as in sequential sputter deposition stations. Also, it possible that the fill material can be formed of multiple layers of different materials, such as a layer of SiOx and a layer of SiN. Other materials may be alloys or mixtures of the above materials. The material selected for the fill material 240 should have a CMP removal rate that is faster than the CMP removal rate for the first overcoat layer 210 so that the first overcoat layer 210 functions as the CMP stop layer.

Figure 3D:
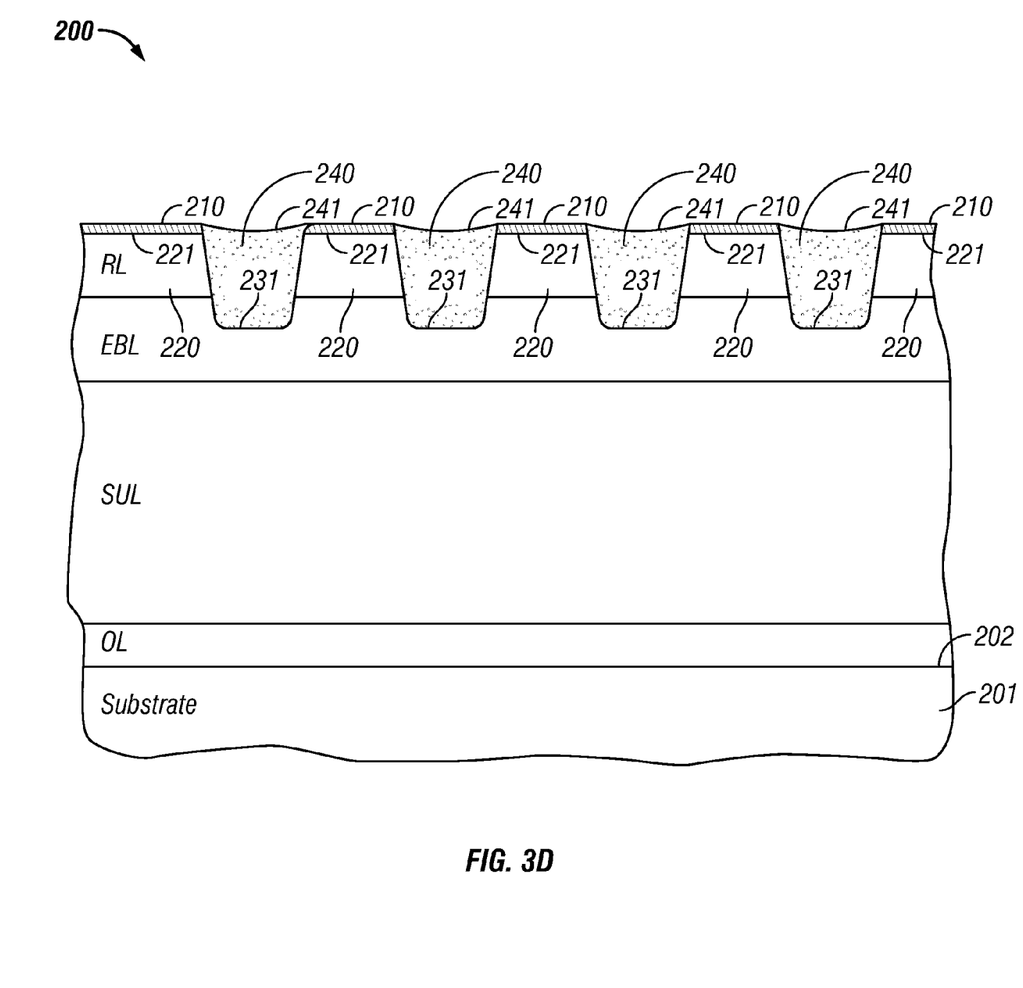

FIG. 3D is a sectional view of the disk 200 after CMP has removed the fill material 240 down to the stop layer (first overcoat layer 210). The first overcoat layer 210 may be made thinner than originally deposited due to either the CMP step or by a subsequent process step such as a plasma etch. The fill material 240 now remains in the recesses on top of lower recess surface 231. The upper surface 241 of the fill material in the recesses may experience a very slight recession following CMP, as depicted in FIG. 3D. However, the upper surface 241 of the recesses and the upper surface of first overcoat layer 210 together form a substantially planar surface. As used herein, "substantially planar" means that the recession of upper surface 241 of the fill material in the recesses is less than about 5 nm from the upper surface of first overcoat layer 210 and not sticking above the upper surface of first overcoat layer 210 by more than about 1 nm. CMP is a well-known process widely used in semiconductor manufacturing and thin-film magnetic recording head manufacturing. The CMP slurry may include a liquid that softens the fill material and a particle that helps cut through the softened fill material to remove it. CMP slurries with different chemical properties are commercially available and are selected based on the material to be removed. Also various CMP endpoint detection systems and techniques are known. For example, measurement of platen and carrier motor current and measurement of platen temperature by infrared (IR) sensor can be used to determine when the CMP process has reached the stop layer.

Figure 3E:
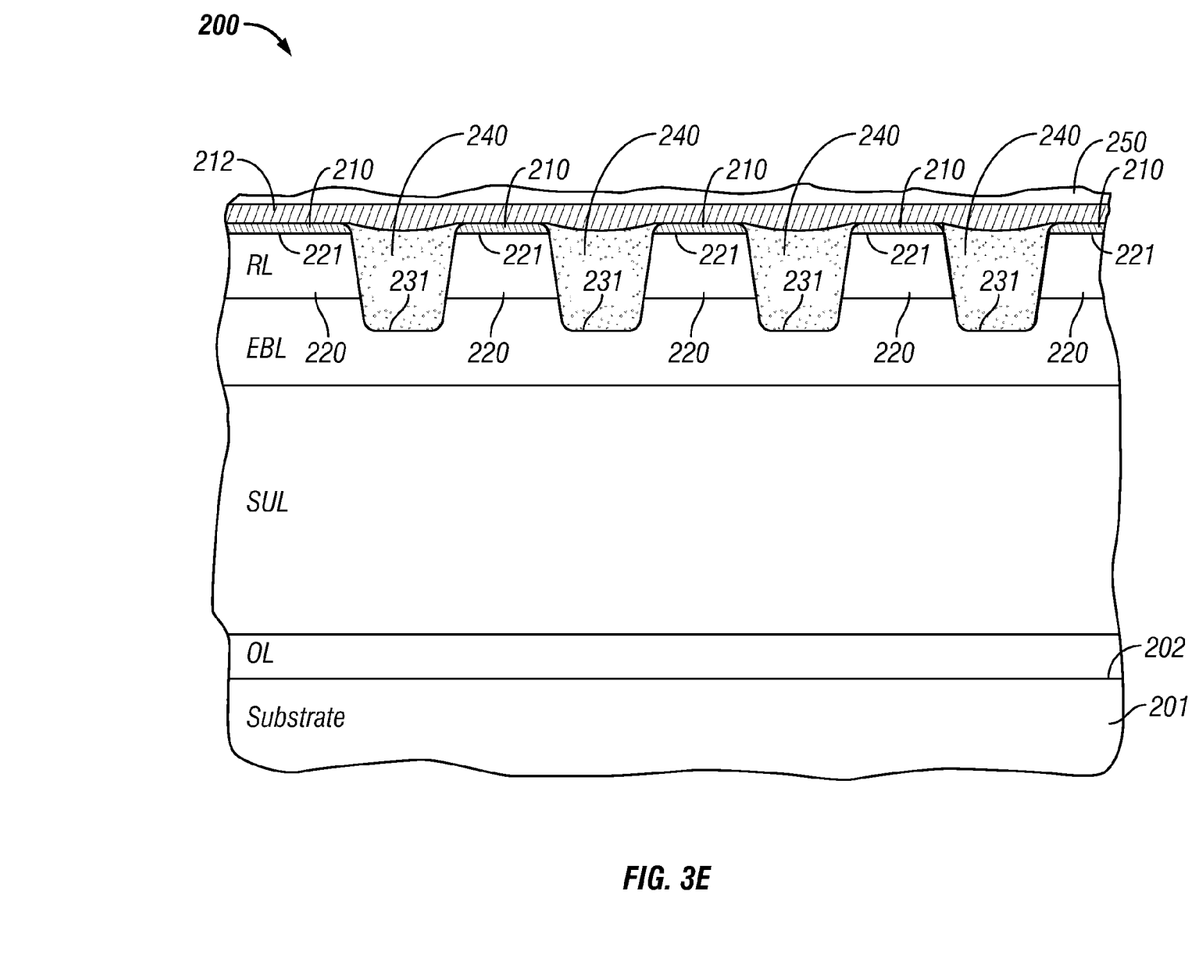

FIG. 3E is a sectional view of the disk 200 after deposition of the second overcoat layer 212 and lubricant layer 250, and thus depicts the completed disk structure according to one embodiment of the invention. The second overcoat layer 212 is deposited, typically by sputter deposition, on the substantially planar surface of the upper surface of first overcoat layer 210 and the upper surface 241 of the fill material 240. The second overcoat layer 212 is preferably a different material from the first overcoat layer 210. Preferably the second overcoat layer 212 is amorphous carbon, like DLC, which may also be hydrogenated or nitrogenated, and is sputter deposited to a thickness between about 1-2 nm. The materials that may be used for the first and second overcoat layers include amorphous carbon such as DLC; carbides such as silicon carbides and boron carbides; nitrides such as silicon nitrides, titanium nitrides, and boron nitrides; ametal oxides, such as $TiO_2$, $ZrO_2$, $Al_2O_3$, $Cr_2O_3$, $Ta_2O_5$ and $ZrO_2$—$Y_2O_3$; and mixtures of these materials Also, while only two overcoat layers are depicted and described, the multilayered overcoat may have three or more layers. Thus, in the embodiment of FIGS. 3A-3E the first overcoat layer 210 is located only on the lands 220 and the second overcoat layer 212 is located on both the lands 220 and the fill material 240 in recesses 230.

The lubricant layer 250 may be a conventional disk lubricant, like a perfluorinated polyether (PFPE) polymer, that is either bonded or unbounded to the second overcoat layer 212. The lubricant is typically applied by dipping the disk into a solution of the PFPE in a suitable solvent and then evaporating the solvent.

Figure 4:
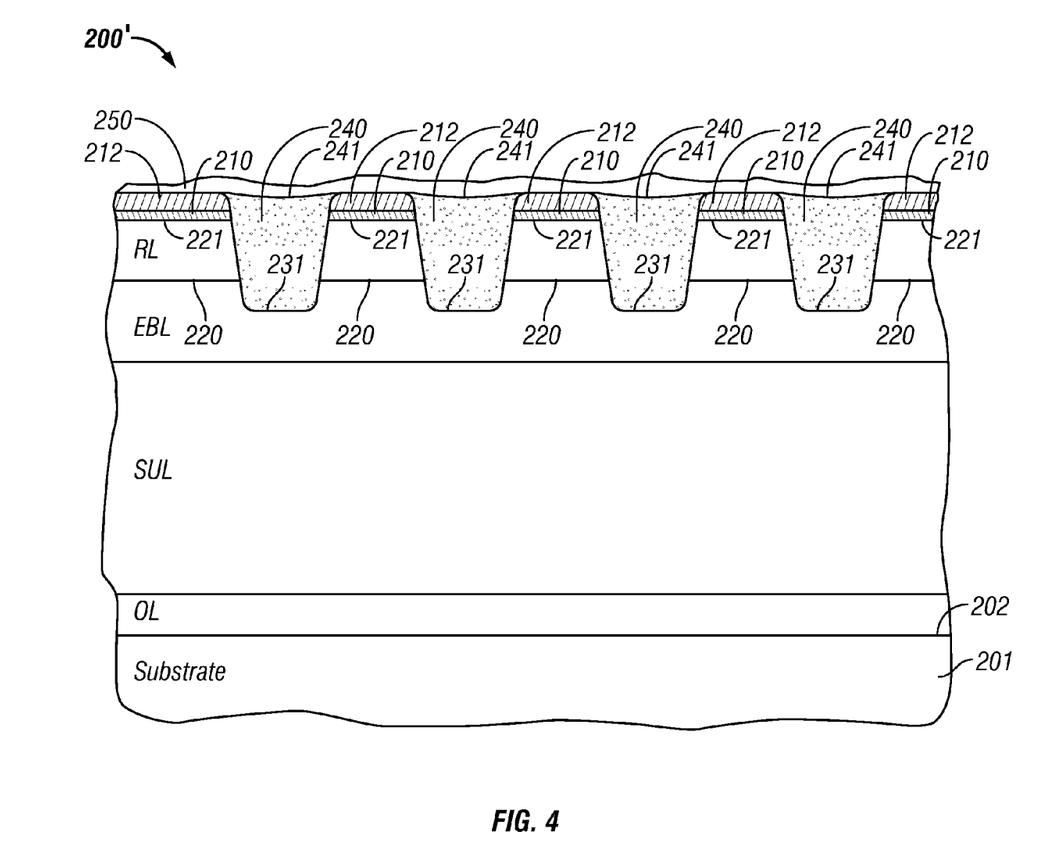
FIG. 4 is a sectional view of a planarized DTM disk according to a second embodiment of the invention.

FIG. 4 is a sectional view of a disk 200' according to a second embodiment of the invention. In this embodiment both overcoat layers 210, 212 form a multilayered overcoat and are located only above the lands 220 with the upper surface of second overcoat layer 214 being substantially planar with the upper surface 241 of the fill material 240 in the recesses. The disk 200' is made in a process similar to that shown in FIGS. 3A-3E, except that in FIG. 3A, the second overcoat layer 212 is sputter deposited on top of the first overcoat layer 210. The remaining process steps are like those shown in FIGS. 3B-3D, after which the lubricant layer is applied, resulting in the disk 200' shown in FIG. 4. The first and second overcoat layers are different materials, preferably a SiN or amorphous carbon, and the fill material is preferably a silicon oxide. In this embodiment the second overcoat layer 212 functions as the CMP stop layer.

FIGS. 5A-5D show an embodiment of the method for planarizing the disk, and the resulting planarized disk, according to a third embodiment of the invention.

Figure 5A:
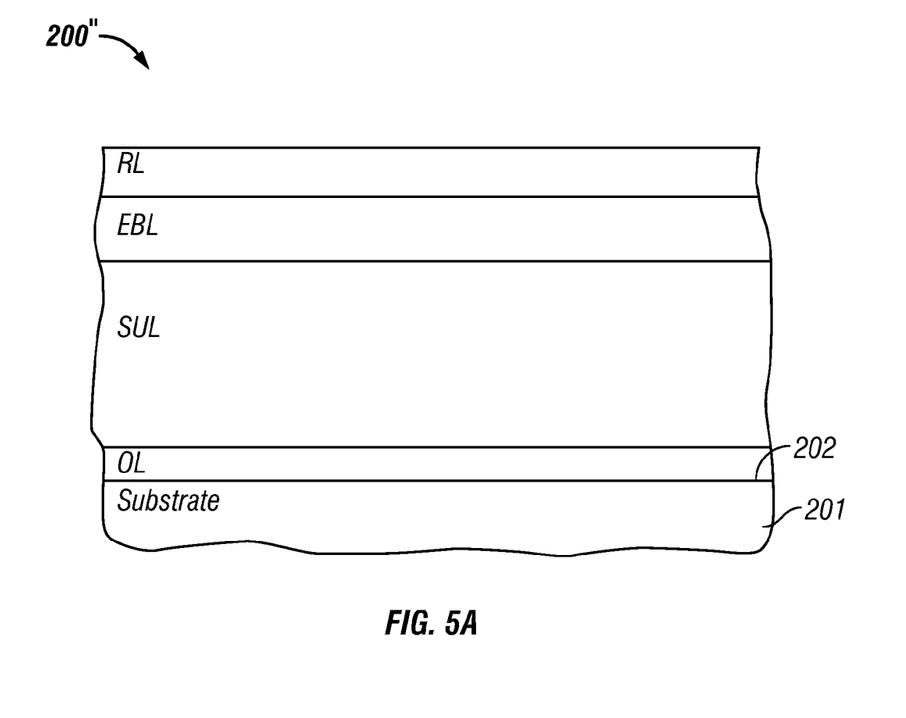
FIGS. 5A-5D are sectional views of a DTM disk taken along a plane perpendicular to the discrete data tracks at various stages of the method for planarizing a disk according to a third embodiment of the invention.

FIG. 5A is a sectional view showing the disk 200" prior to lithographic patterning and etching to form the DTM disk. The disk 200" is like that shown in FIG. 3A except there is no first overcoat layer, so that the upper surface of the disk is the upper surface of the RL.

Figure 5B:
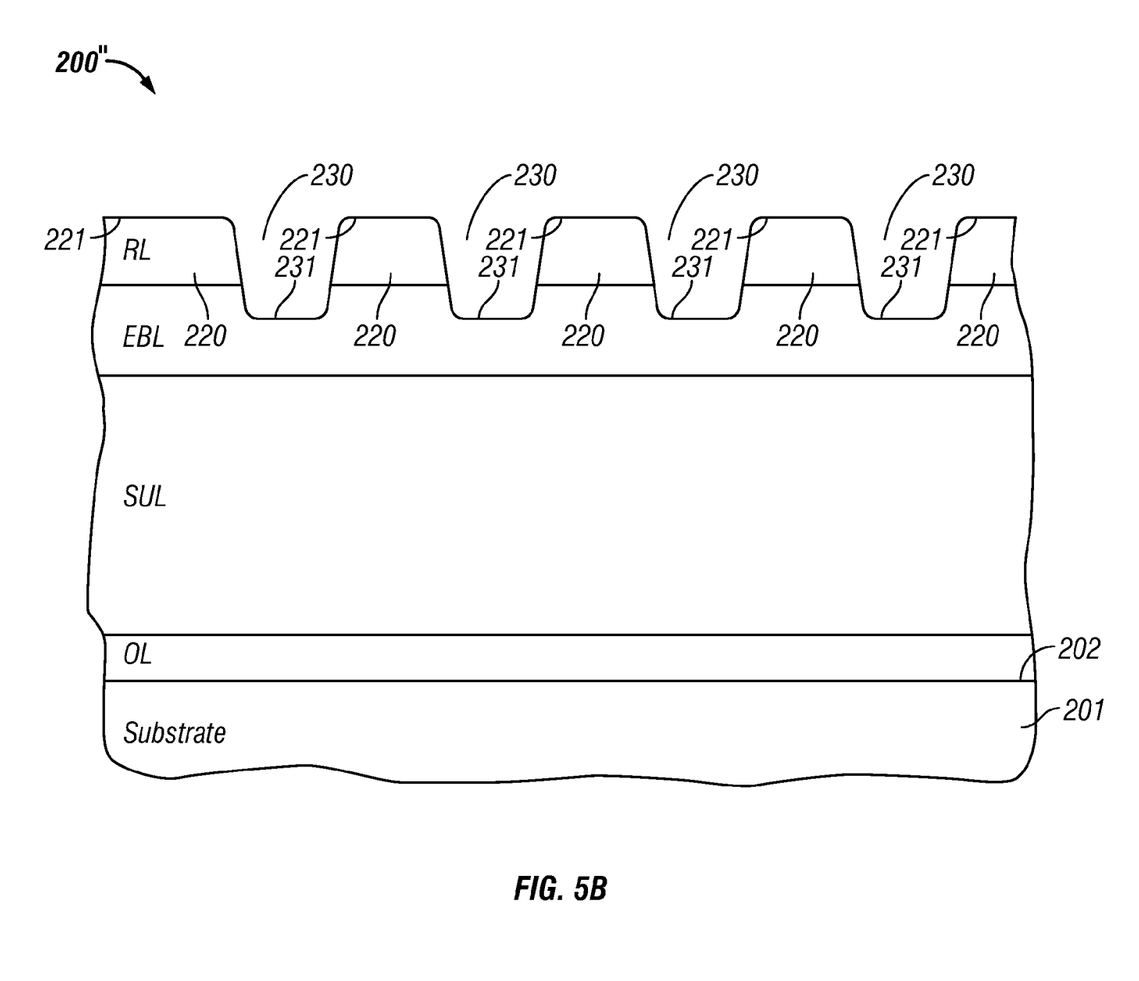

FIG. 5B is a sectional view of the disk 200" after lithographic patterning and etching. The etching may be a vacuum etching process like ion milling or reactive ion etching (RIE). After etching, elevated lands 220 of RL material and grooves or recesses 230 are formed above the substrate surface 202. The lands 220 have an upper surface 221. The recesses 230 have a lower surface 231 below the upper surface 221 of the lands 220. In the example shown in FIG. 5B, the etching has been performed to a depth such that all of the RL material and a portion of the EBL material has been removed from the regions of the recesses 230. However, alternatively the etching can be performed to a depth such that only a portion of the RL material is removed. In that case, there would be a layer of RL material below the lower surface 231 of the recesses 230. Also, alternatively the etching can be performed to a depth such that substantially all the of the RL is removed and essentially none of the EBL is removed.

Figure 5C:
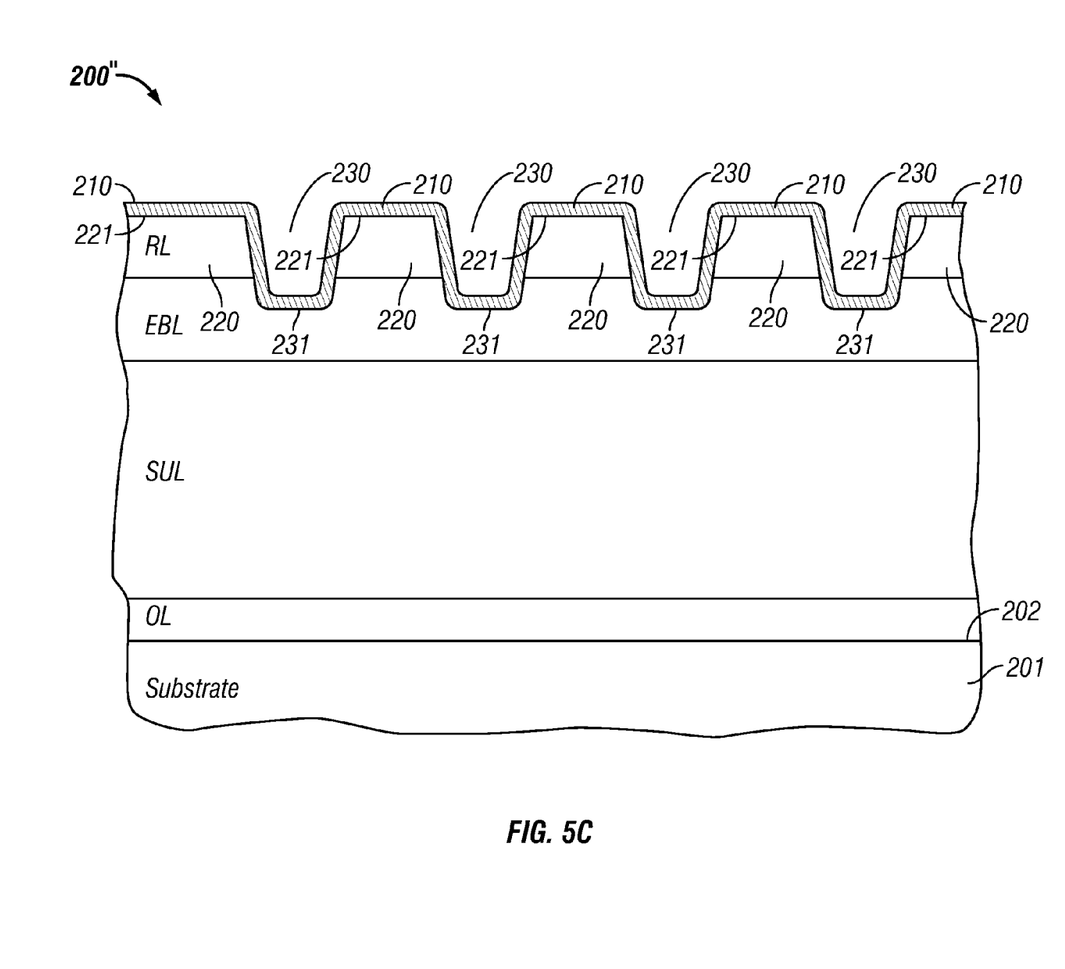

FIG. 5C is a sectional view of the disk 200" after deposition of first overcoat layer 210. The first overcoat layer 210 of a subsequent multilayered overcoat is deposited on the top surface 221 of the lands 220 and into the recesses 230. This results in the first overcoat layer 210 being located on the lower surface 231 of the recesses and on the sidewalls of the recesses. The first overcoat layer 210 will function as a CMP stop layer and is preferably a layer of amorphous carbon, DLC or a silicon nitride (SiN) sputter deposited to a thickness of about 1-3 nm. Next, fill material is deposited, like in FIG. 3C, and then the fill material is removed down to the stop layer (first overcoat layer 210) by the CMP process, like in FIG. 3D.

Figure 5D:
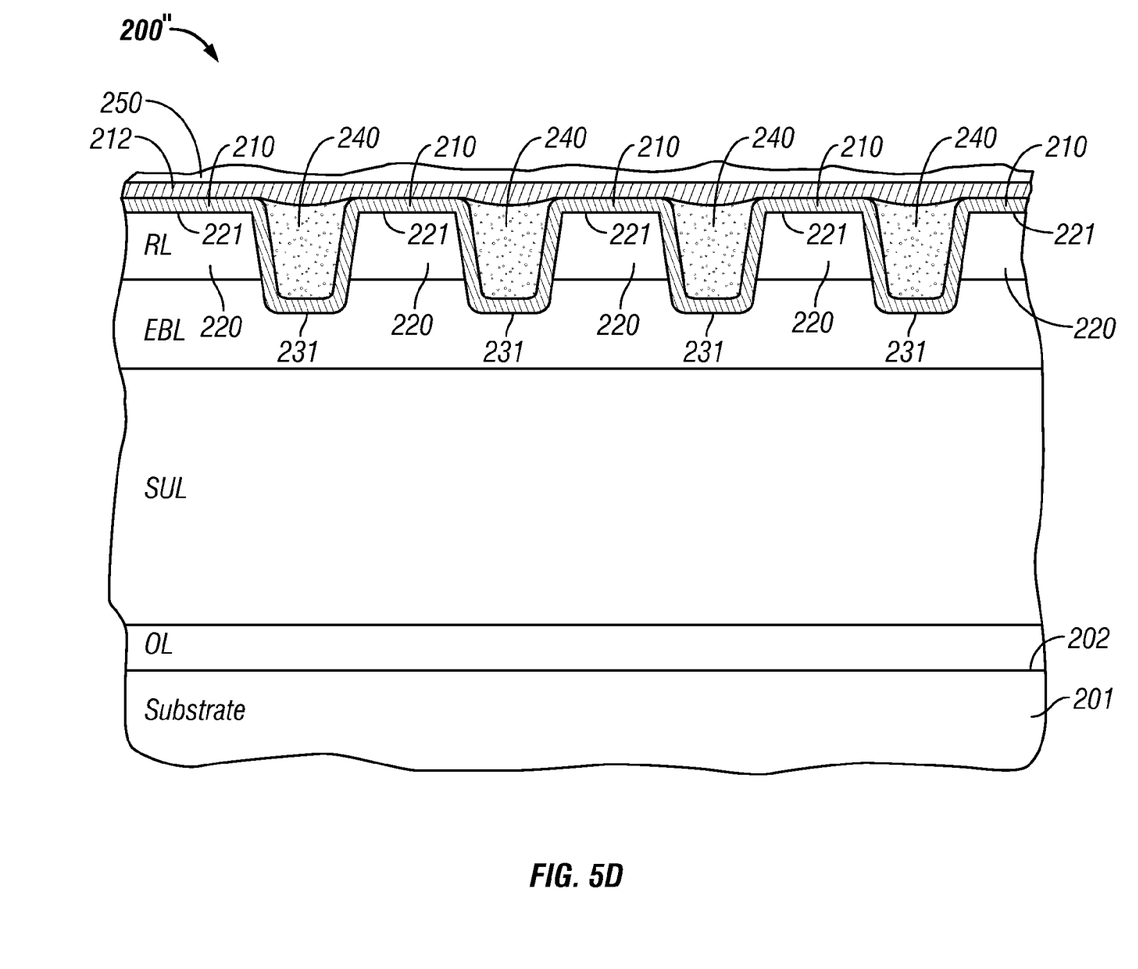

FIG. 5D is a sectional view of the disk 200" after deposition of the second overcoat layer 212 and lubricant layer 250, and thus depicts the completed disk structure according to the third embodiment of the invention. The disk 200" in FIG. 5D is thus like the disk 200 in FIG. 3E, except that the first overcoat layer 210 is also located on the lower surface 231 of the recesses and the sidewalls of the recesses.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a substrate having a generally planar surface;
   a plurality of elevated lands formed of perpendicular magnetic recording material on the substrate, the lands having an upper surface above the substrate surface;
   a plurality of recesses on the substrate between the lands, the recesses having sidewalls and a lower surface lower than the upper surface of the lands;
   nonmagnetic fill material in the recesses in direct contact with the sidewalls and lower surfaces of the recesses, the fill material having an upper surface; and
   a multilayered overcoat on the upper surfaces of the lands comprising a first overcoat layer on and in contact with the lands and a second overcoat layer on and in contact with the first overcoat layer, the second overcoat layer formed of a material different from the material of the first overcoat layer and having a chemical-mechanical polishing (CMP) removal rate less than the CMP removal rate of the fill material, the upper surface of the second overcoat layer and the upper surface of the nonmagnetic fill material in the recesses being substantially coplanar; and
   a layer of lubricant on and in contact with the second overcoat layer and the upper surface of the nonmagnetic fill material in the recesses.

2. The disk of claim 1 wherein each of the first and second overcoat layers is formed of a material selected from a silicon nitride and amorphous carbon.

3. The disk of claim 1 wherein the fill material is selected from the group consisting of a silicon oxide (SiOx); a SiOx-metal where the metal is selected from Ti, Ta, Al Cr and Pt; a silicon nitride (SiN); a SiN-metal where the metal is selected from Ti, Ta, Al Cr and Pt; a Ti alloy; and a metal selected from a metal selected from W, Ti, Ta, and Cu.

4. The disk of claim 1 further comprising a soft magnetic underlayer (SUL) on the substrate surface below the lands and recesses and a exchange-break layer (EBL) on the SUL below the lands and recesses.

5. The disk of claim 1 further comprising a layer of magnetic material on the substrate below the recesses and the lands.

6. The disk of claim 1 wherein the disk is a discrete-track media disk and wherein the lands comprise radially-spaced concentric tracks and the recesses with nonmagnetic fill material comprise radially-spaced guard bands between the tracks.

7. The disk of claim 1 wherein the disk is a bit-patterned media disk and wherein the lands comprise discrete data islands and the recesses with nonmagnetic fill material comprise regions between the data islands.

8. The disk of claim 1 wherein the lands comprise generally radially-directed servo blocks and the recesses comprise regions between the servo blocks.

* * * * *